(12) United States Patent
Woo

(10) Patent No.: US 8,196,419 B2
(45) Date of Patent: Jun. 12, 2012

(54) REFRIGERATOR

(75) Inventor: Ki-Cheol Woo, Masan (KR)

(73) Assignee: LG Electronics Inc., Seoul (KR)

( * ) Notice: Subject to any disclaimer, the term of this patent is extended or adjusted under 35 U.S.C. 154(b) by 642 days.

(21) Appl. No.: 12/377,850

(22) PCT Filed: Sep. 20, 2007

(86) PCT No.: PCT/KR2007/004617
§ 371 (c)(1),
(2), (4) Date: Feb. 17, 2009

(87) PCT Pub. No.: WO2008/035942
PCT Pub. Date: Mar. 27, 2008

(65) Prior Publication Data
US 2010/0218525 A1    Sep. 2, 2010

(30) Foreign Application Priority Data

Sep. 20, 2006  (KR) .......................... 10-2006-0091336
Sep. 20, 2006  (KR) .......................... 10-2006-0091337

(51) Int. Cl.
   *F25C 1/00* (2006.01)
(52) U.S. Cl. ............................. 62/137; 62/344; 221/12
(58) Field of Classification Search .................... 62/135, 62/137, 340, 344; 221/12
See application file for complete search history.

(56) References Cited

U.S. PATENT DOCUMENTS

| | | |
|---|---|---|
| 3,441,176 A | 4/1969 | Reynolds et al. |
| 3,635,043 A | 1/1972 | Sterling |
| 4,822,996 A | 4/1989 | Lind |
| 5,033,273 A | 7/1991 | Buchser et al. |
| 5,291,752 A * | 3/1994 | Alvarez et al. ............... 62/344 |
| 5,429,269 A * | 7/1995 | Mejias ..................... 221/150 R |
| 5,501,367 A | 3/1996 | Chigira |
| 5,671,606 A | 9/1997 | Schroeder et al. |
| 5,855,120 A | 1/1999 | Kim |
| 6,050,097 A | 4/2000 | Nelson et al. |
| 6,062,036 A | 5/2000 | Hobelsberger |
| 6,314,745 B1 | 11/2001 | Janke et al. |
| 6,381,975 B1 | 5/2002 | Tsuchikawa |
| 6,439,428 B1 | 8/2002 | Schroeder et al. |

(Continued)

FOREIGN PATENT DOCUMENTS

CN    1157882 A    8/1997

(Continued)

OTHER PUBLICATIONS

English Translation of Office Action for Chinese Appl. No. 2006800318817, dated May 8, 2009.

*Primary Examiner* — Marc Norman
(74) *Attorney, Agent, or Firm* — Birch, Stewart, Kolasch & Birch, LLP

(57) ABSTRACT

The present invention discloses a refrigerator which can precisely adjust and display not only an ice making and storing amount but also an ice dispensing amount. As an ice level sensing unit provided at an ice storage unit for storing ice senses the ice storage amount by light, it is possible to adjust and display the ice storage amount. Moreover, as an ice sensing unit provided at an ice guide unit for dispensing ice senses the ice dispensing amount by light, it is possible to adjust and display the ice dispensing amount.

27 Claims, 8 Drawing Sheets

U.S. PATENT DOCUMENTS

| | | |
|---|---|---|
| 6,581,392 B1 | 6/2003 | Gist et al. |
| 7,201,005 B2 | 4/2007 | Voglewede et al. |
| 7,210,601 B2 | 5/2007 | Hortin et |
| 7,325,408 B2 | 2/2008 | Lim |
| 7,543,453 B2 | 6/2009 | Boarman et al. |
| 7,921,667 B2 | 4/2011 | Gradl et al. |
| 2003/0019236 A1 | 1/2003 | Heims et al. |
| 2003/0089120 A1* | 5/2003 | Kampert et al. ............ 62/188 |
| 2003/0110952 A1 | 6/2003 | Lassota |
| 2005/0044874 A1 | 3/2005 | Lee et al. |
| 2006/0064994 A1 | 3/2006 | Lim |
| 2006/0196214 A1 | 9/2006 | Lee et al. |
| 2008/0228318 A1 | 9/2008 | Roo et al. |

FOREIGN PATENT DOCUMENTS

| | | |
|---|---|---|
| CN | 2532434 Y | 1/2003 |
| CN | 1755306 A | 4/2006 |
| EP | 1607700 A2 | 12/2005 |
| GB | 2 188 724 A | 10/1987 |
| JP | 06-137736 A | 5/1994 |
| JP | 2676316 B2 | 7/1997 |
| JP | 11-513475 A | 11/1999 |
| JP | 2000-130902 A | 5/2000 |
| JP | 2003-262438 A | 9/2003 |
| KR | 10-0162443 B1 | 8/1998 |
| KR | 10-1999-0065602 A | 8/1999 |
| KR | 1999-0065602 B1 | 8/1999 |
| KR | 10-2000-0034724 A | 6/2000 |
| KR | 10-0408573 B1 | 6/2000 |
| KR | 2000-0034724 A | 6/2000 |
| KR | 10-0332757 B1 | 4/2002 |
| KR | 20-0338113 Y1 | 12/2003 |
| KR | 20-0347071 Y1 | 3/2004 |

\* cited by examiner

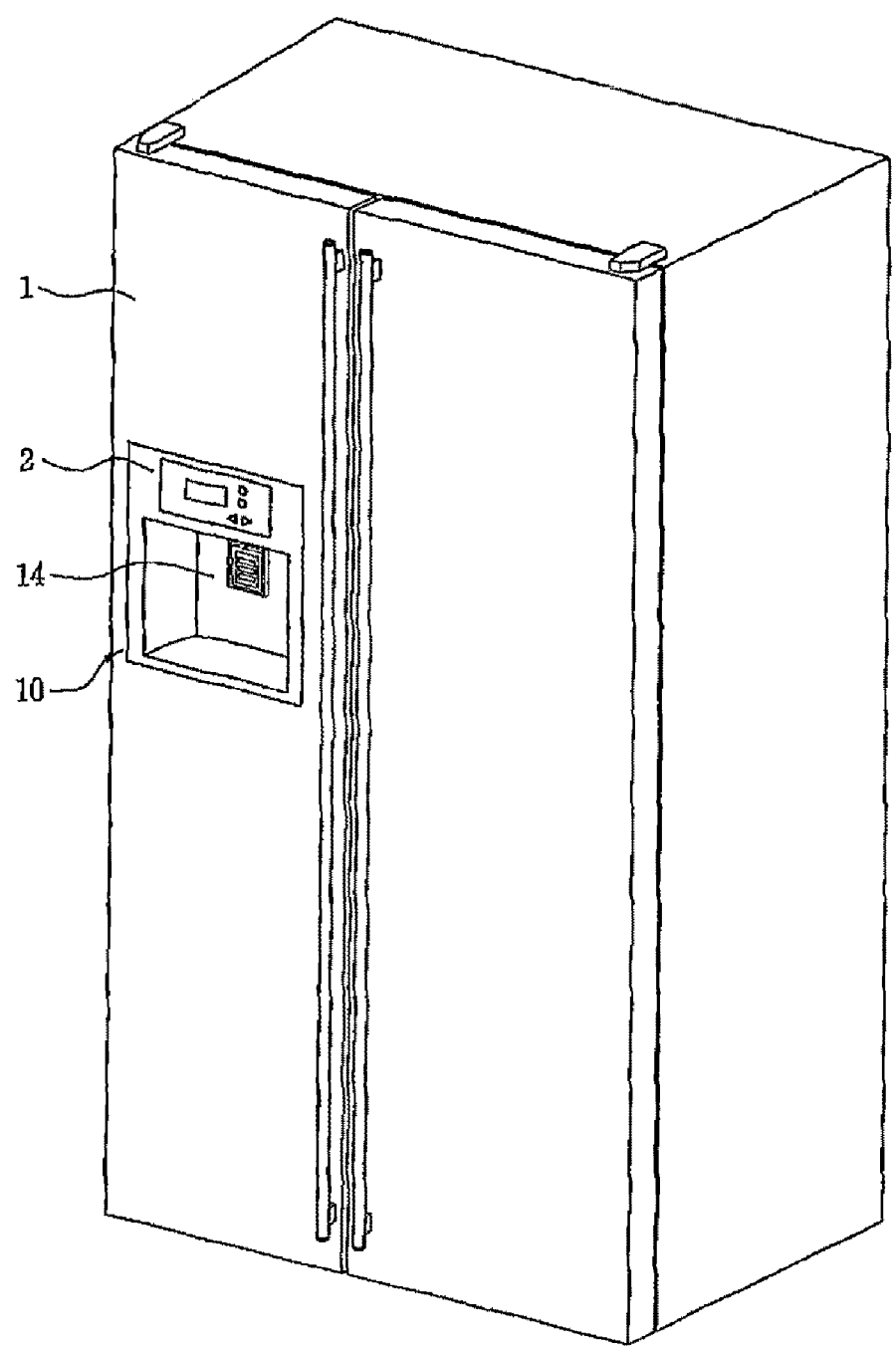
[Fig. 1]

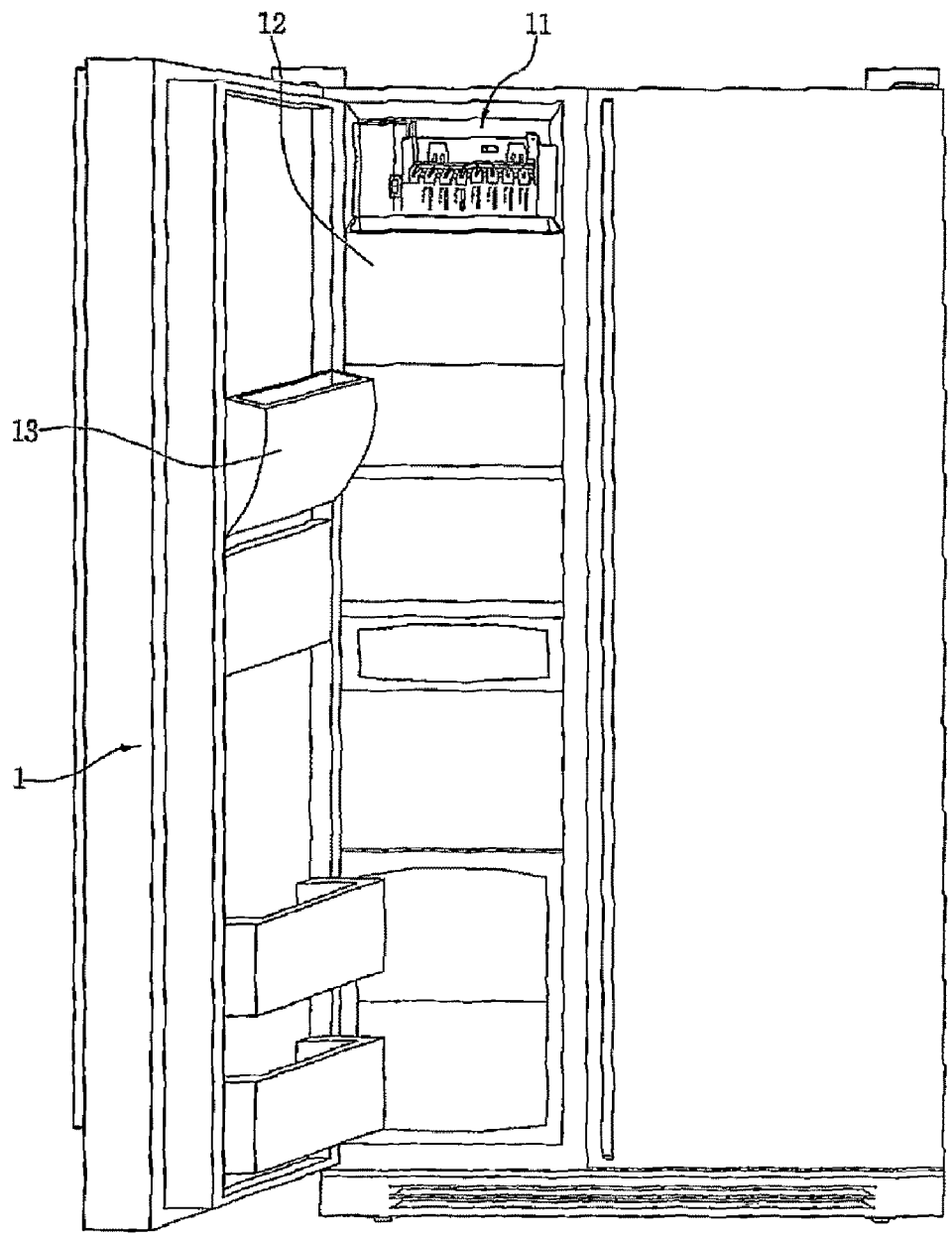
[Fig. 2]

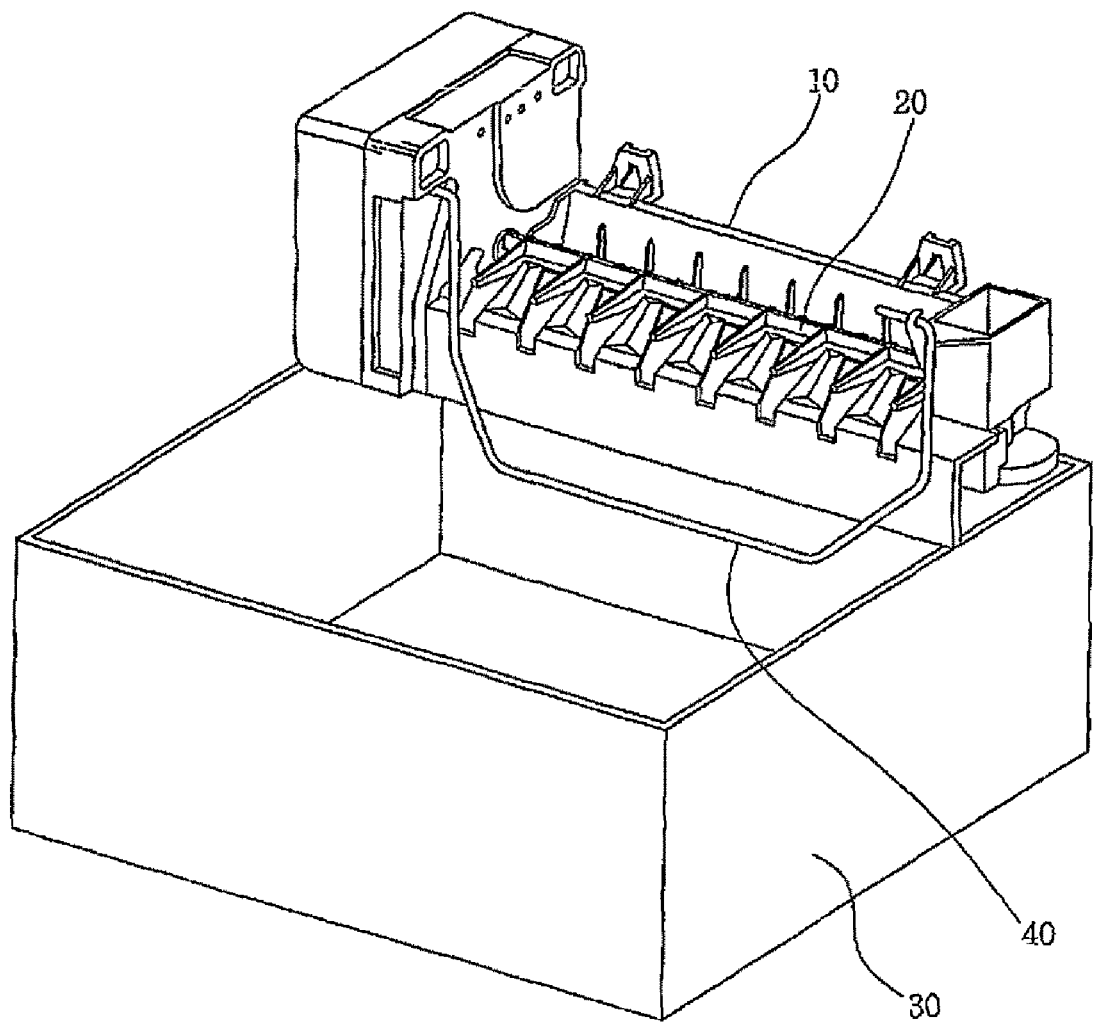
[Fig. 3]

[Fig. 4]
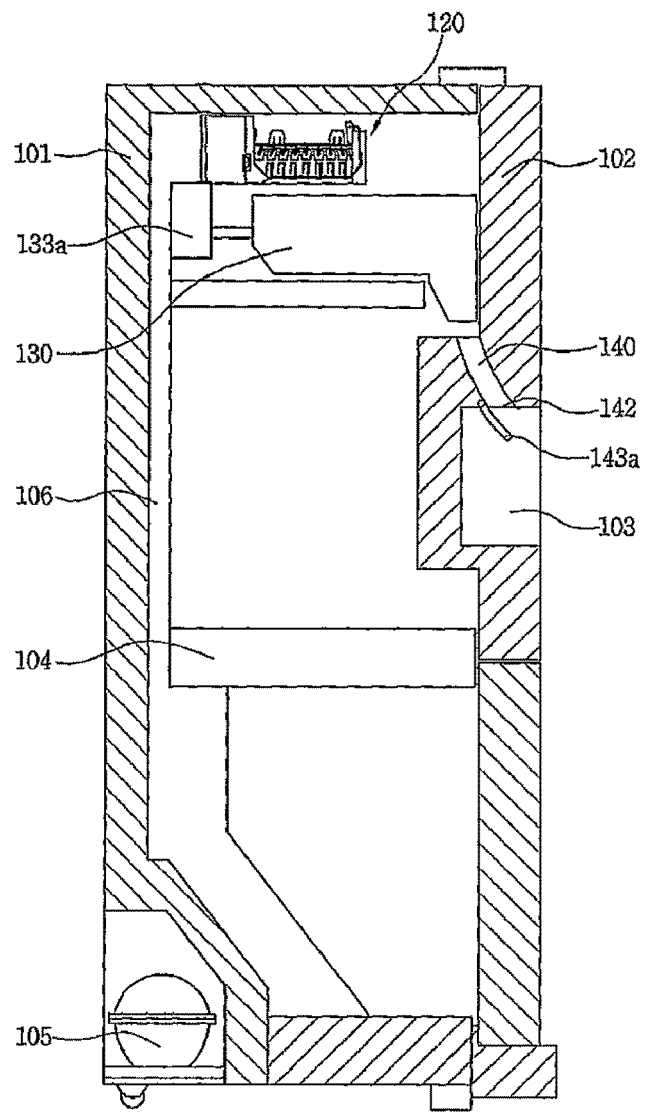
[Fig. 5]
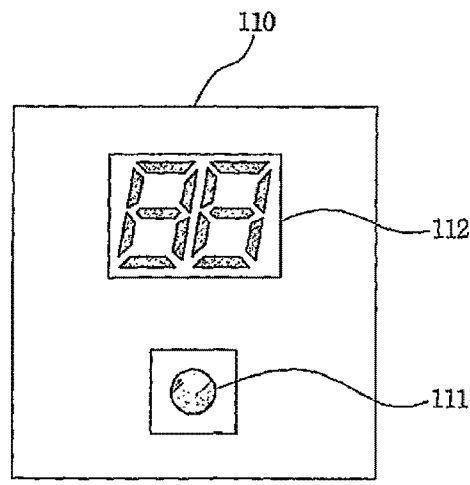

[Fig. 6]
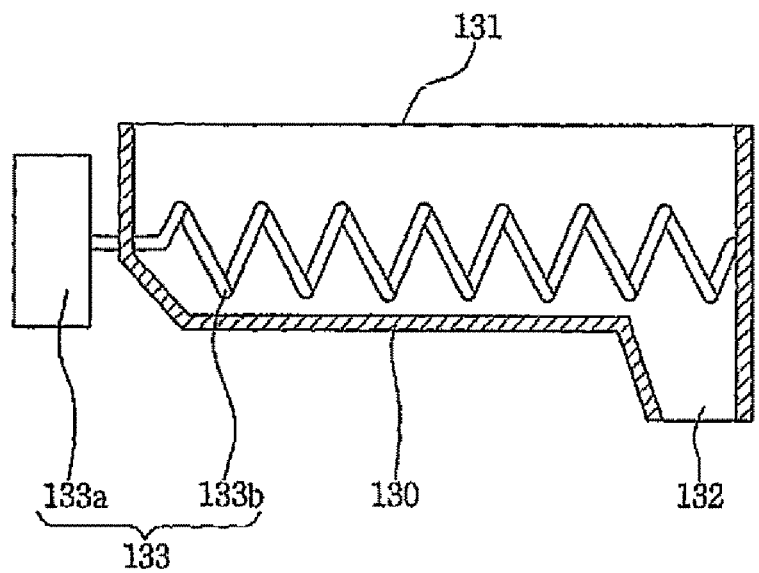
[Fig. 7]
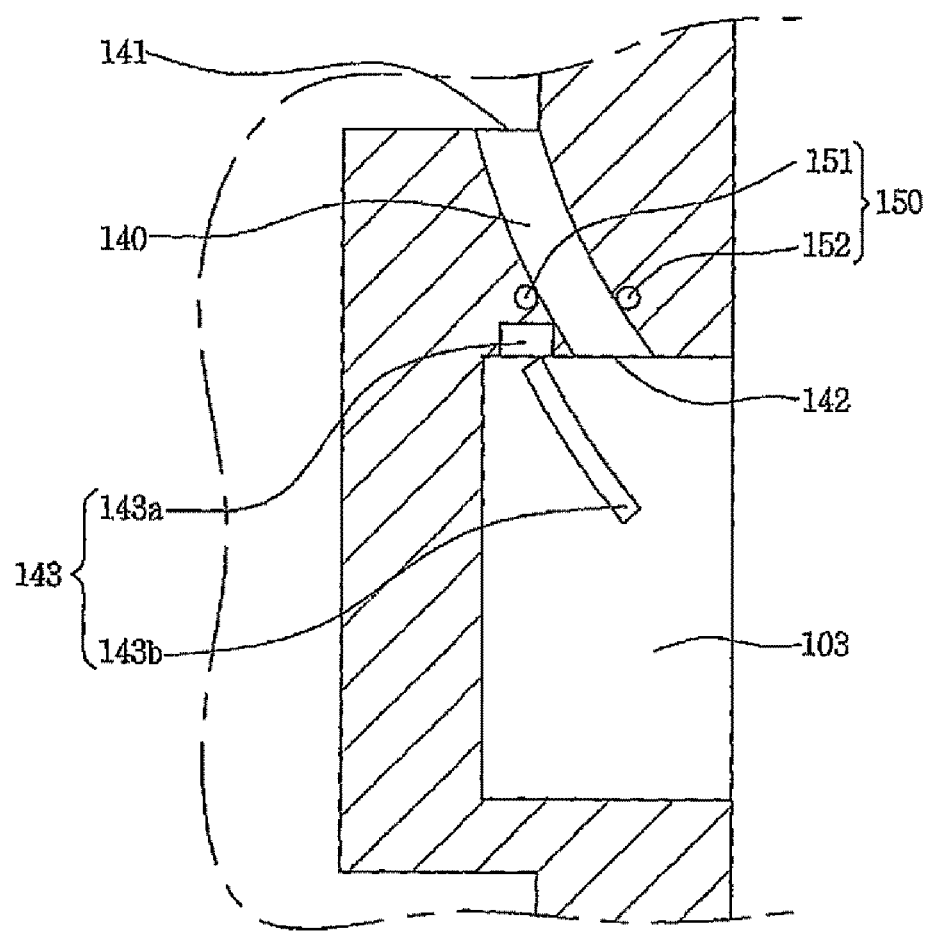

[Fig.8]
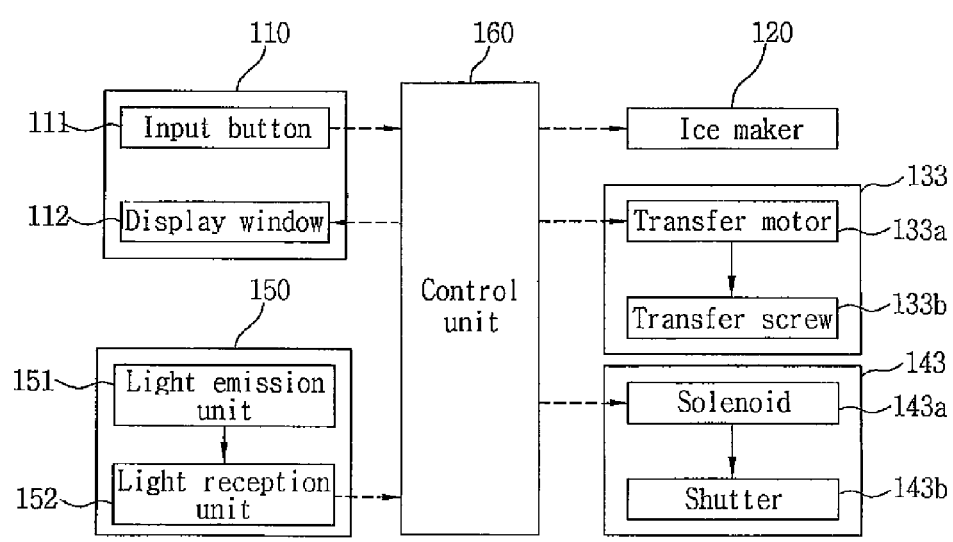

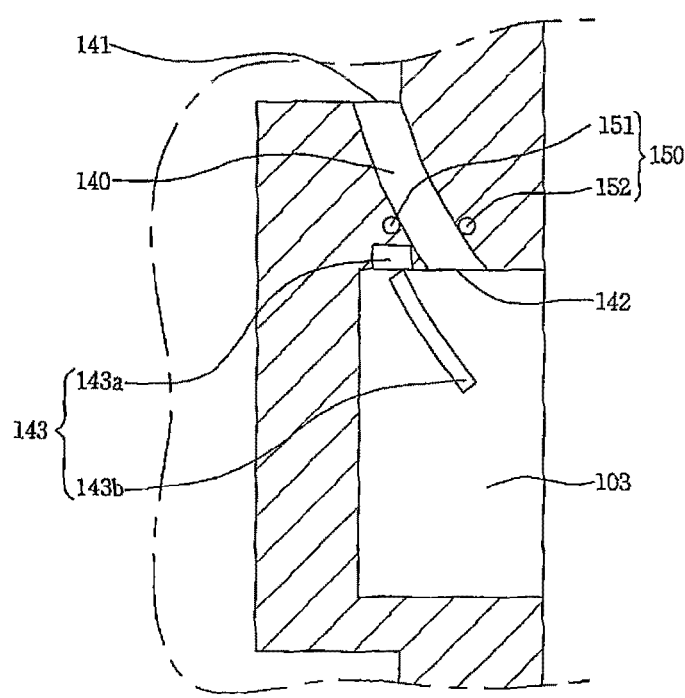
[Fig. 8]
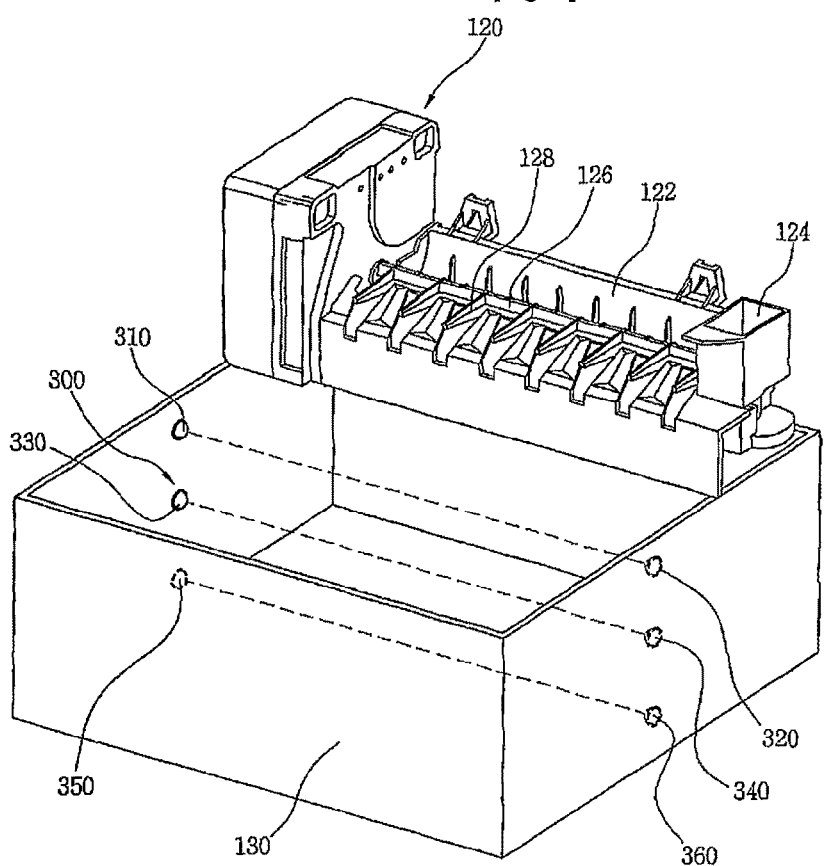
[Fig. 9]

[Fig. 10]
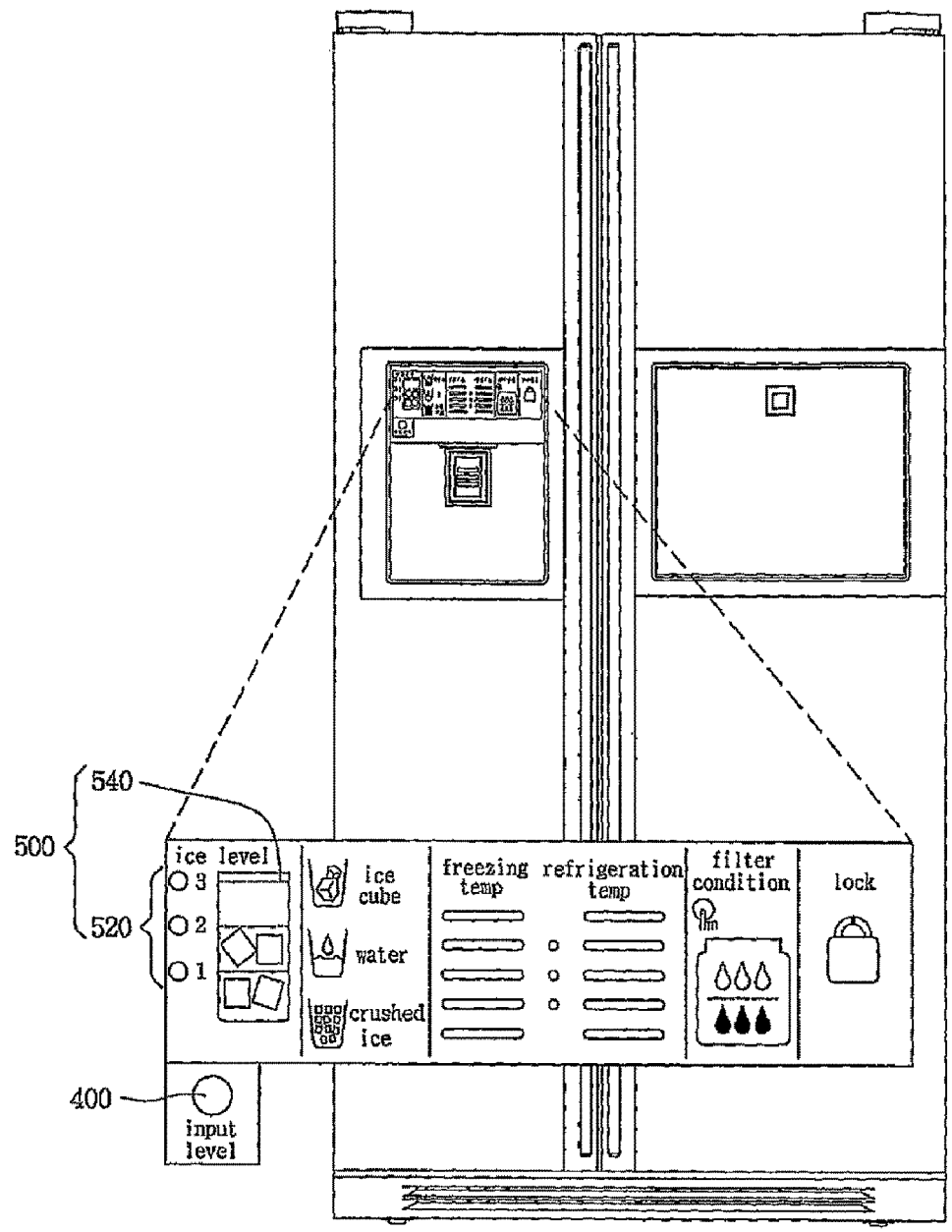
[Fig. 11]
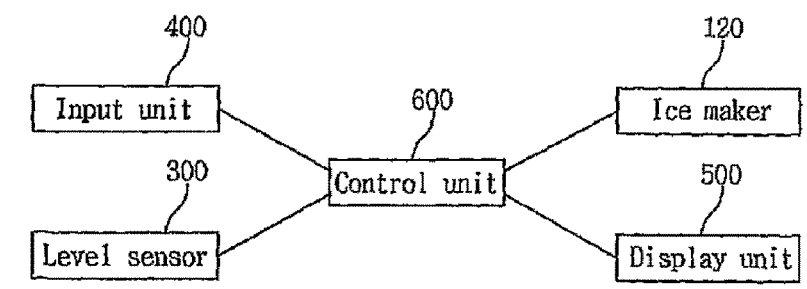

REFRIGERATOR

TECHNICAL FIELD

The present invention relates to a refrigerator which can precisely adjust and display an ice storage amount and an ice dispensing amount.

BACKGROUND ART

In general, a refrigerator is partitioned off into a freezing chamber and a refrigerating chamber. While the refrigerating chamber freshly stores foods and vegetables at a temperature of about 3 to 4° C. for an extended period of time, the freezing chamber freezes and stores meats and fishes at a temperature below zero.

Normally, a top mount type refrigerator wherein a freezing chamber and a refrigerating chamber are defined in the up-down direction, and a freezing chamber door and a refrigerating chamber door are installed at the freezing chamber and the refrigerating chamber to be openable and closable has been widely used. With the large scale tendency of the refrigerator, a side by side type refrigerator wherein a freezing chamber and a refrigerating chamber are defined at both sides, and a freezing chamber door and a refrigerating chamber door pivot around both side ends to be openable and closable has been developed.

In the side by side type refrigerator, the freezing chamber or the refrigerating chamber in which the cool air can be circulated has a large capacity. When the freezing chamber door or the refrigerating chamber door is opened and closed, a cool air loss increases and efficiency decreases. Accordingly, a dispensing hole is formed on the side of the freezing chamber door so that a user can acquire ice from the outside, and a home bar is formed on the side of the refrigerating chamber door to be openable and closable so that the user can take out water or drink from the refrigerating chamber.

FIGS. 1 and 2 are views illustrating one example of a conventional refrigerator with an ice dispensing device.

The conventional refrigerator will be described with reference to FIGS. 1 and 2. A freezing chamber and a refrigerating chamber are defined at both sides of the refrigerator. Doors 1 are installed to open and close the freezing chamber and the refrigerating chamber, respectively. An ice dispensing device 10 is provided to dispense ice to the door side 1.

A control panel 2 is installed at the door 1 so that a user can select a predetermined function of the refrigerator. A control unit (not shown) is built in the refrigerator, for controlling the predetermined function of the refrigerator according to the input of the control panel 2.

In detail, the ice dispensing device 10 includes an ice maker 11 for making ice, an ice bank 12 for accommodating the ice made in the ice maker 11, an ice chute 13 for discharging the ice of the ice bank 12 to the outside, and a dispenser unit 14. A water supply passage (not shown) for supplying water to the ice maker 11 is provided in a built-in type.

While the ice maker 11 and the ice bank 12 are provided in the freezing chamber, the ice chute 13 and the dispenser unit 14 are provided at the door 1. In a state where the door 1 closes the freezing chamber, the ice bank 12 communicates with the ice chute 13.

Moreover, a button (not shown) with an ice dispensing function is formed at the control panel 2. A separate transfer means (not shown) for transferring ice to the ice chute 13 is provided at the ice bank 12. The control unit controls the operations of the ice maker 11 and the transfer means according to a signal inputted through the control panel 2.

Generally, an ice dispensing amount is adjusted according to a button clicking time, or a set amount of ice is dispensed by button clicking.

Accordingly, when the user clicks the button with the ice dispensing function, the control unit controls the operations of the ice maker 11 and the transfer means according to the signal inputted from the button. The ice stored in the ice bank 13 is guided by the transfer means, and dispensed through the ice chute 13 and the dispenser unit 14.

FIG. 3 is a view illustrating one example of an ice maker provided in a conventional refrigerator. The conventional ice maker 11 includes an ice making container 10 supplied with water to make ice, an ejector 20 rotated to separate the ice from the ice making container 10, and a lever 11d for sensing an amount of the ice made in the ice making container 10, separated by the ejector 20, and stored in an ice storage container 30 provided at one side of the ice making container 10, and controlling the operation of the ice maker 11.

In the conventional refrigerator, an ice tray has been used to make ice. However, when making ice, a user must manually fill water in the ice tray and separate ice therefrom. In order to alleviate such inconvenience, a refrigerator with an ice maker for automatically making and transferring ice has been suggested. Examples of the ice maker and the refrigerator having the same have been disclosed in Korean Laid-Open Patent Publication Nos. 2004-0053700 and 2004-0102568.

However, in the conventional refrigerator, even if the ice storage container is full of ice, the lever does not sense the ice full state and stop ice making. That is, it is impossible to make and store ice as much as the user wants. As a result, electric energy is wasted to make too much ice. As the ice is stored for a long time, the user cannot take out fresh ice.

In addition, in the conventional refrigerator, the user cannot confirm the ice stored in the ice storage container from the outside of the refrigerator. Every time the user wants to confirm the ice, he/she must open the refrigerator.

Furthermore, in the conventional refrigerator, when the user clicks the button with the ice dispensing function to take out ice, a predetermined amount of ice is dispensed according to a button clicking time or a button clicking number. The user cannot take out a precise amount of ice. Therefore, the ice is often excessively dispensed and wasted, which leads to large energy consumption.

DISCLOSURE OF INVENTION

Technical Problem

An object of the present invention is to provide a refrigerator which can save electric energy by making ice as much as a user needs.

Another object of the present invention is to provide a refrigerator which can supply fresh ice by storing ice as much as a user needs.

Yet another object of the present invention is to provide a refrigerator which can allow a user to identify an ice storage amount from the outside without opening a refrigerator door.

Yet another object of the present invention is to provide a refrigerator which can dispense a precise amount of ice.

Technical Solution

In one aspect of the present invention, a refrigerator includes: an ice storage unit for storing the ice transferred from the ice maker; an ice level sensing unit for sensing an amount of the ice stored in the ice storage unit in a non-contact type; and a control unit for controlling the operation of the ice maker according to the ice amount of the ice storage unit sensed by the ice level sensing unit.

The ice level sensing unit includes a light emission unit for irradiating light, and a light reception unit for sensing the light irradiated from the light emission unit.

The light emission unit and the light reception unit are provided on the facing surfaces of the ice storage unit to be level with each other.

The light irradiated by the light emission unit and sensed by the light reception unit is infrared light.

The refrigerator further includes an ice level sensing display unit for displaying the ice storage amount of the ice storage unit sensed by the ice level sensing unit.

The refrigerator further includes an ice level input unit for inputting a level of the ice to be stored in the ice storage unit.

The refrigerator further includes an ice level input display unit for displaying the ice amount inputted through the ice level input unit.

The control unit compares the ice amount inputted through the ice level input unit with the ice amount of the ice storage unit sensed by the ice level sensing unit, and controls the operation of the ice maker according to the comparison result.

In another aspect of the present invention, a refrigerator includes: an ice maker supplied with water, for making ice and transferring the ice to an ice storage unit; the ice storage unit for storing the ice transferred from the ice maker; an ice level sensing unit for sensing an amount of the ice stored in the ice storage unit in a non-contact type; an ice level input unit for inputting an amount of the ice to be stored in the ice storage unit; and an ice level display unit for displaying at least one of the ice amount inputted through the ice level input unit and the ice storage amount of the ice storage unit sensed by the ice level sensing unit.

The ice level sensing unit includes a light emission unit for irradiating light, and a light reception unit for sensing the light irradiated from the light emission unit.

The refrigerator further includes a control unit for controlling the operation of the ice maker according to the ice amount of the ice storage unit sensed by the ice level sensing unit.

The refrigerator further includes a control unit for controlling the operation of the ice maker according to the ice amount inputted through the ice level input unit.

The refrigerator further includes a control unit for comparing the ice amount inputted through the ice level input unit with the ice amount of the ice storage unit sensed by the ice level sensing unit, and controlling the operation of the ice maker according to the comparison result.

In yet another aspect of the present invention, a refrigerator includes: an ice storage unit formed in the refrigerator, a transfer means for transferring ice being provided at one side thereof; an ice guide unit communicating with the ice storage unit, and guiding the ice to be externally dispensed; an ice sensing unit provided at the ice guide unit, for sensing an amount of the ice passing through the ice guide unit; and a control unit for comparing the inputted ice amount with the ice amount sensed by the ice sensing unit, and controlling the operation of the transfer means according to the comparison result.

The refrigerator further includes an ice amount input unit for receiving an input of an ice amount, and transferring the inputted ice amount to the control unit.

The ice amount input unit includes an ice amount input button for inputting an ice amount, and an ice amount display window for displaying the ice amount inputted through the ice amount input button, or an amount of the ice to be dispensed.

A flat cross section of the ice guide unit is larger than a maximum cross section of an ice piece by a predetermined area so that the ice pieces can consecutively pass through the ice guide unit one by one.

The refrigerator further includes a dispensing hole formed at the outer portion of the refrigerator to communicate with the ice guide unit, for dispensing ice, wherein the ice guide unit further includes an opening/closing means installed closely to the dispensing hole, for opening and closing the ice guide unit.

The ice sensing unit includes a light emission unit for generating light, and a light reception unit for receiving the light generated by the light emission unit.

The transfer means includes: a transfer motor provided in the opposite direction to an outlet for discharging ice from the ice storage unit; and a transfer screw installed in the ice storage unit, connected to the transfer motor, and rotated to transfer the ice to the outlet of the ice storage unit.

The refrigerator further includes: an ice maker supplied with water, for making ice and transferring the ice to the ice storage unit; and an ice level sensing unit for sensing an amount of the ice stored in the ice storage unit in a non-contact type.

The ice level sensing unit includes a light emission unit for irradiating light, and a light reception unit for sensing the light irradiated from the light emission unit.

The refrigerator further includes: an ice level input unit for receiving an input of a level of the ice to be stored in the ice storage unit, and transferring the inputted ice level to a control unit; and the control unit for controlling the operation of the ice maker according to at least one of the ice amount inputted through the ice level input unit and the ice amount of the ice storage unit sensed by the ice level sensing unit.

The ice level input unit includes an ice level input button for inputting an amount of the ice to be stored in the ice storage unit, and an ice level display window for displaying at least one of the ice amount inputted through the ice level input button and the ice amount of the ice storage unit sensed by the ice level sensing unit.

In yet another aspect of the present invention, a refrigerator includes: an ice maker supplied with water, for making ice and transferring the ice to an ice storage unit; the ice storage unit for storing the ice transferred from the ice maker; an ice guide unit communicating with the ice storage unit, and guiding the ice to be externally dispensed; and a display unit for displaying at least one of an amount of the ice to be stored in the ice storage unit, an amount of the ice stored in the ice storage unit, an amount of the ice to be dispensed through the ice guide unit, and an amount of the ice dispensed through the ice guide unit.

The display unit includes an ice level input button for inputting the amount of the ice to be stored in the ice storage unit.

The display unit includes an ice level sensing display window for displaying the ice amount inputted through the ice level input button.

The refrigerator further includes an ice level sensing unit for sensing the amount of the ice stored in the ice storage unit in a non-contact type, wherein the display unit includes an ice level sensing display window for displaying the ice amount sensed by the ice level sensing unit.

The display unit includes an ice amount input button for inputting the amount of the ice to be dispensed through the ice guide unit.

The ice amount input button is formed to input a number of ice pieces.

The refrigerator further includes an ice sensing unit for sensing the amount of the ice passing through the ice guide unit, wherein the display unit includes an ice amount display window for displaying at least one of the ice amount inputted through the ice amount input button and the amount of the ice dispensed through the ice guide unit.

The ice amount display window displays an ice amount obtained by subtracting the amount of the ice dispensed through the ice guide unit from the ice amount inputted through the ice amount input button.

Advantageous Effects

According to the present invention, in the above configuration, as the user can set the ice making and storing amount, waste of electric energy is prevented. Since the user can make and store the ice as much as he/she needs, the user can get fresh ice anytime.

According to the present invention, the user can identify the ice making and storing amount from the outside without opening the refrigerator, which alleviates the troublesomeness of opening the refrigerator to confirm the ice.

According to the present invention, the user can take out the ice as much as he/she needs, which reduces waste of ice and energy.

BRIEF DESCRIPTION OF THE DRAWINGS

The present invention will become better understood with reference to the accompanying drawings which are given only by way of illustration and thus are not limitative of the present invention, wherein:

FIGS. 1 and 2 are views illustrating one example of a conventional refrigerator with an ice dispensing device;

FIG. 3 is a view illustrating one example of an ice maker provided in a conventional refrigerator;

FIG. 4 is a view illustrating an embodiment of a refrigerator according to the present invention;

FIG. 5 is a view illustrating one example of a display unit of the refrigerator according to the present invention;

FIG. 6 is a view illustrating an example of the ice maker and the ice storage unit of the refrigerator according to the present invention.

FIG. 7 is a view illustrating examples of the ice guide unit and the ice sensing unit of the refrigerator according to the present invention.

FIG. 8 is a block view illustrating a control flow of controlling the ice dispensing amount of the refrigerator according to the present invention.

FIG. 9 is a view illustrating another example of the ice maker and the ice storage unit of the refrigerator according to the present invention.

FIG. 10 is a view illustrating another example of a display unit of the refrigerator according to the present invention.

FIG. 11 is a block view illustrating a control flow of controlling an ice dispensing amount of the refrigerator according to the present invention.

EXPLANATION OF REFERENCE NUMERALS FOR MAJOR PORTIONS SHOWN IN DRAWINGS

110: Input unit 111: Ice amount input button
112: Ice amount input display window
540: Ice level sensing display window
400: Ice level input button
500: Ice level display window
120: Ice maker 130: Ice storage unit
131: Inlet 132: Outlet
133: Transfer unit 310, 330, 350: Light emission unit
320, 340, 360: light reception unit 140: Ice guide unit
150: Ice sensing unit 600: Control unit

MODE FOR THE INVENTION

Preferred embodiments of the present invention for achieving the above objects will be described in detail with reference to the accompanying drawings.

FIG. 4 is a view illustrating an embodiment of a refrigerator according to the present invention. A freezing chamber and a refrigerating chamber are separately defined in a main body 101 with an open front face. Doors 102 are installed to open and close the freezing chamber and the refrigerating chamber, respectively. A dispenser unit 103 for dispensing ice is provided at the door 102, and an ice dispensing device for dispensing a predetermined amount of ice is provided at the freezing chamber and the door 102.

A shelf 104 for partitioning is installed in the freezing chamber and the refrigerating chamber. A freezing cycle including a compressor 105 is provided at one side of the main body 101. An evaporator (not shown) of the freezing cycle is mounted in an inner wall of the main body 101. A cool air circulation passage 106 is formed to supply the cool air cooled through the evaporator to the freezing chamber or the refrigerating chamber.

The ice dispensing device is provided in the freezing chamber, for generating ice by the cool air supplied through the cool air circulation passage 106. A water supply passage (not shown) for supplying water from the outside is installed to connect to the ice dispensing device.

Particularly, the ice dispensing device includes an input unit 110, an ice maker 120, an ice storage unit 130, an ice guide unit 140, an ice sensing unit 150 and a control unit 600. The ice storage unit 130 senses an ice storage amount, and the control unit 600 adjusts the ice storage amount by controlling the operation of the ice maker 120. Meanwhile, the ice sensing unit 150 senses an ice dispensing amount, and the control unit 600 adjusts the ice dispensing amount by controlling the operation of the ice storage unit 130.

FIG. 5 and FIG. 10 are views illustrating examples of a display unit of the refrigerator according to the present invention. The display unit is installed at the front face of the door 102, and provided with various buttons electrically connected to the control unit 600, for operating predetermined functions of the refrigerator. The display unit includes an ice level input button 400, ice level display window 500, an ice amount input button 111, and an ice amount display window 112.

In detail, the ice level input button 400 is provided at the refrigerator, for inputting an amount of the ice to be stored in the ice storage unit 130. In this embodiment, the ice level input button 111 is formed at the outer portion of the refrigerator door 102 on the installation side of the ice maker 120 so that a user can select a level indicating the amount of the ice to be stored in the ice storage unit 130. Therefore, the user can make and store ice as much as he/she wants.

The ice level display window 500 is provided at the refrigerator, for displaying at least one of the ice amount inputted through the ice level input button 400 and the ice amount sensed by the ice storage unit 130. In this embodiment, the ice amount display window 500 is formed at the outer portion of the refrigerator door 102 on the installation side of the ice maker 120, and provided with the ice level input display window 520 for displaying the ice amount inputted by the user through the ice level input button 400 by three steps (first, second and third levels), and the ice level sensing display window 540 for displaying the ice amount sensed by the ice storage unit 130 by three steps (first, second and third levels).

Accordingly, the user can identify at least one of the ice amount inputted through the ice level input button 400 and the amount of the ice stored in the ice storage unit 130 from the outside of the refrigerator.

The ice level input button 400 is provided at the refrigerator, for inputting an amount of the ice to be dispensed through the ice guide unit 140. In this embodiment, the ice level input button 400 is formed at the outer portion of the refrigerator door 102 on the installation side of the ice maker 120 so that the user can input the ice amount by numbers or increase the ice amount by a predetermined amount in every clicking. Thus, the user can take out ice as much as he/she wants.

The ice amount display window 112 is provided at the refrigerator to display at least one of the ice amount inputted through the ice amount input button 111 and the ice amount sensed by the ice sensing unit 150. In this embodiment, the ice amount display window 112 is formed at the outer portion of the refrigerator door 102 on the installation side of the ice maker 120, for displaying the ice amount initially inputted through the ice amount input button 111, and displaying the amount of the ice to be dispensed by subtracting the amount of the dispensed ice during an ice dispensing process.

Therefore, the user can identify at least one of the ice amount inputted through the ice amount input button 111 and the ice amount sensed by the ice sensing unit 150 from the outside of the refrigerator.

For example, the ice amount display window 112 is preferably composed of seven segments wherein seven bar-shaped light emitting diodes are arranged in an '8' shape, and turned on and off to display decimal numbers.

FIGS. 6 and 9 are views illustrating examples of the ice maker and the ice storage unit of the refrigerator according to the present invention. The ice maker 120 is supplied with water, for making and transferring ice. The ice storage unit 130 stores the ice and senses the amount of the ice.

In detail, the ice maker 120 receives water, and makes and transfers ice. In this embodiment, the ice maker 120 includes an ice making chamber 122 supplied with water, for generating ice, a water supply portion 124 formed at one long direction side of the ice making chamber 122, for supplying water to the ice making chamber 122, an ice making motor accommodated in the other side of the ice making chamber 122, and an ejector 126 provided with pins 128, connected to the ice making motor, and rotated to eject the ice made in the ice making chamber 122 to the ice storage unit 130.

The ice maker 120 is installed in the freezing chamber, and variously implemented with a tray (not shown) connected to a water supply passage and filled with water, and a separation means (not shown) for separating ice from the tray. As the configuration of the ice maker has been publicly known, detailed explanations thereof are omitted.

The ice storage unit 130 stores the ice transferred from the ice maker 120. In this embodiment, the ice storage unit 130 is provided at the lower portion of the ice maker 120, for storing the ice ejected from the ice making chamber 122 by the ejector 126. The ice storage unit 130 has an inlet 131 formed by opening a top face thereof to receive the ice, and an outlet 132 formed by opening a front portion of a bottom face thereof to discharge the ice.

Preferably, the outlet 132 of the ice storage unit 130 is larger than a maximum cross section of an ice piece by a predetermined area in order to consecutively discharge the ice pieces one by one.

In addition, a transfer unit 133 is provided to guide the ice stored in the ice storage unit 130 to the outlet 132 of the ice storage unit 130. In this embodiment, the transfer unit 133 includes a transfer motor 133a positioned in the opposite direction to the outlet 132 of the ice storage unit 130, and a threaded transfer screw 133b axially coupled to the transfer motor 133a, and extended to the outlet 132 of the ice storage unit 130. The transfer motor 133a is installed to connect to the control unit 600.

As the transfer motor 133a operates, the transfer screw 133b is rotated to transfer the ice dropped to an upper portion thereof to the outlet 132 of the ice storage unit 130.

Moreover, an ice level sensing unit is provided in the ice storage unit 130, for sensing the ice storage amount by light. In this embodiment, the ice level sensing unit includes light emission units 310, 330 and 350 and light reception units 320, 340 and 360. The light emission units 310, 330 and 350 and the light reception units 320, 340 and 360 are formed at both sides of the ice storage unit 130 to be parallel with each other. The light emission units 310, 330 and 350 include light emitting diodes (LED) for irradiating infrared light, and the light reception units 320, 340 and 360 sense the infrared light irradiated by the light emission units 310, 330 and 350. Any kinds of means that can irradiate light and sense the irradiated light can be used as the light emission units 310, 330 and 350 and the light reception units 320, 340 and 360. In this embodiment, the ice level sensing unit includes three pairs of light emission units 310, 330 and 350 and light reception units 320, 340 and 360. In order to sense the amount of the ice stored in the ice storage unit 130 by three steps, the pairs of the light emission units 310, 330 and 350 and the light reception units 320, 340 and 360 constitute a first level sensor 310 and 320, a second level sensor 330 and 340, and a third level sensor 350 and 360, respectively. Here, so as to divide the steps of sensing the amount of the ice stored in the ice storage unit 130 into sub-steps, more than three pairs of the light emission units 310, 330 and 350 and the light reception units 320, 340 and 360 can be provided. It is thus possible to sense the amount of the ice stored in the ice storage unit 130.

Accordingly, the control unit 600 receives the amount of the ice to be stored in the ice storage unit 130 from the ice level input button 111, displays the ice amount through the ice level input display window 112, receives the amount of the ice stored in the ice storage unit 130 from the ice level sensing unit, displays the ice amount through the ice level sensing display window 40, compares the inputted ice amount with the stored ice amount, and controls the transfer motor 133b and the like to make and transfer the ice according to the comparison result.

FIG. 7 is a view illustrating examples of the ice guide unit and the ice sensing unit of the refrigerator according to the present invention. The ice guide unit 140 guides the ice transferred from the ice storage unit 130 to be externally dispensed, and the ice sensing unit 140 senses the amount of the ice passing through the ice guide unit 140.

In detail, the ice guide unit 140 guides the ice stored in the ice storage unit 130 to be dispensed to the outside of the refrigerator. In this embodiment, the ice guide unit 140 is formed in a tube shape so that the ice can pass therethrough, and provided at the refrigerator door 102 on the installation side of the ice maker 120. The ice guide unit 140 includes a communication hole 141 positioned at the inner face of the refrigerator door 102 to receive the ice dropped from the outlet 132 of the ice storage unit 130, and a dispensing hole 142 positioned at the outer portion of the refrigerator door 102 to drop the ice. The dispensing hole 142 is positioned lower than the communication hole 141 so that the ice can be freely dropped and dispensed.

Identically to the outlet 132 of the ice storage unit 130, preferably, the ice guide unit 140 is larger than a maximum cross section of an ice piece by a predetermined area so that the ice pieces can consecutively pass through the ice guide unit 140 one by one.

An opening/closing unit 143 for opening and closing the ice guide unit 140 is provided at the ice guide unit 140 adjacent to the dispensing hole 142. The opening/closing unit 143 includes a solenoid 143a for supplying an opening/closing force, and a shutter 143b connected to the solenoid 143a, for opening and closing the ice guide unit 140, and intercepting heat transfer to/from the freezing chamber. The solenoid 143a is installed to connect to the control unit 600.

The shutter 143b can be formed in a check valve type to supply the opening/closing force of blocking the dispensing hole 142 of the ice guide unit 140 by a spring. Besides, various examples of the shutter are applicable.

The ice sensing unit 150 senses the amount of the ice passing through the ice guide unit 140. In this embodiment, the ice sensing unit 150 senses the ice in a non-contact type, and includes a light emission unit 151 for generating light and a light reception unit 152 for sensing light. The light emission unit 151 and the light reception unit 152 are installed on the facing surfaces of the ice guide unit 140, namely, in a crossing direction or a perpendicular direction to an ice passing direction of the ice guide unit 140. The light reception unit 152 is installed to connect to the control unit 600.

Preferably, the light irradiated by the light emission unit 151 and sensed by the light reception unit 152 is infrared light, and the light emission unit 151 is a low-cost light emitting diode for generating the infrared light. However, the present invention is not limited thereto.

Therefore, the control unit 600 receives the necessary amount of the ice from the ice amount input button 114, displays the ice amount through the ice amount display window 115, controls the solenoid 143a to open the shutter 143b for a predetermined time, senses the dispensed ice amount through the ice sensing unit 150, compares the inputted ice amount with the dispensed ice amount, displays the amount of the ice to be dispensed through the ice amount display window 115, and adjusts the ice dispensing amount according to the comparison result.

According another examples of the ice guide unit and the ice sensing unit of the refrigerator according to the present invention, the ice sensing unit 150 can be formed in a contact type. For example, a pressing protrusion that can be elastically pressed and restored is formed in the ice guide unit 140. When the ice passes through the ice guide unit 140, as the pressing protrusion is pressed, an electrical signal is generated. The electrical signal is transferred to the control unit 600 to sense the amount of the ice dispensed through the ice guide unit 140.

FIG. 8 is a block view illustrating a control flow of controlling the ice dispensing amount of the refrigerator according to the present invention. The control unit 600 controls the ice dispensing operation through the ice guide unit 140 from the ice storage unit 130 according to at least one of the ice amount inputted through the ice amount input button 111 and the ice amount sensed by the ice sensing unit 150. In this embodiment, the control unit 600 connects to the ice amount input button 111, the ice amount display window 112, the ice maker 120, the ice storage unit 130, the ice guide unit 140 and the ice sensing unit 150, displays through the ice amount display window 105 the ice amount which the user inputs through the ice amount input button 114 to take out the ice through the ice guide unit 140, and dispenses the ice.

In detail, when the control unit 600 operates the transfer motor 133a to transfer the ice stored in the ice storage unit 130, as the transfer screw 133b is rotated, the ice dropped on the transfer screw 133b is guided to the outlet 132 of the ice storage unit 130, freely dropped from the outlet 132 of the ice storage unit 130 to the communication hole 141 of the ice guide unit 140, and dispensed through the dispensing hole 142 of the ice guide unit 140 along the ice guide unit 140.

While the ice is dispensed through the dispensing hole 142 of the ice guide unit 140 along the ice guide unit 140, the light reception unit 152 of the light sensing unit 150 senses the light generated by the light emission unit 151 of the ice sensing unit 150. Every time the ice passes between the light emission unit 151 and the light reception unit 152, a signal between the light emission unit 151 and the light reception unit 152 is intercepted. Therefore, the control unit 600 can sense the ice amount.

the control unit 600 compares the set ice amount with the sensed ice amount, controls the operations of the display window 112, the ice maker 120, the transfer motor 133a and the solenoid 143a according to the comparison result to dispense the ice as much as the set ice amount, and displays the ice amount obtained by subtracting the dispensed ice amount from the inputted ice amount through the ice amount display window 115.

FIG. 11 is a block view illustrating a control flow of controlling the ice storage amount of the refrigerator according to the present invention. The control unit 600 controls the operation of the ice maker 120 according to at least one of the ice amount inputted through the ice level input unit 400 and the ice amount of the ice storage unit 130 sensed by the ice level sensing unit. In this embodiment, the control unit 600 connects to the ice level input button 111, the ice level input display window 112, the ice level sensing display window 500, the ice level sensing unit and the ice maker 120, displays through the ice level input display window 112 the ice amount which the user inputs through the ice level input button 111 to store the ice in the ice storage unit 130, and controls the ice maker 120 to receive water and make ice. Thereafter, the ice maker 120 makes and transfers the ice, and the ice storage unit 130 stores the ice. As the amount of the ice stored in the ice storage unit 130 increases, the infrared light irradiated by the light emission units 310, 330 and 350 of the ice level sensing unit is hidden by the ice or reflected, and thus is not sensed by the light reception units 320, 340 and 360 of the ice level sensing unit. Here, the control unit 600 stops the operation of the ice maker 120, and displays the ice amount sensed by the ice level sensing unit through the ice level sensing display window 40.

For example, when the user sets the amount of the ice to be stored in the ice storage unit 130 through the ice level input button 111 so that the second level can be displayed on the ice level input display window 112, the ice maker 120 makes ice and transfers the ice to the ice storage unit 130 until the second level sensor 330 and 340 of the ice storage unit 130 senses the ice. When the ice pieces are accumulated in the ice storage unit 130 and sensed by the second level sensor 330 and 340, the control unit 600 stops the operation of the ice maker 120 not to transfer the ice from the ice maker 120 to the ice storage unit 130. At the same time, the control unit 600 displays that the amount of the ice stored in the ice storage unit 130 is the second level through the ice level sensing display window 500. As a result, the user can make and store ice as much as he/she wants.

The side by side type refrigerator has been taken as an example and explained in detail on the basis of the preferred embodiments and the attached drawings of the present invention. However, it is understood that the present invention should not be limited to these embodiments and drawings but various changes and modifications can be made by one skilled in the art within the spirit and scope of the present invention as hereinafter claimed.

The invention claimed is:

1. A refrigerator, comprising:
an ice maker configured to be supplied with water, for making ice and transferring the ice to an ice storage unit;
the ice storage unit for storing the ice transferred from the ice maker;
an ice level sensing unit for sensing a level of the ice stored in the ice storage unit in a non-contact type; and
a control unit for controlling the operation of the ice maker according to the ice level of the ice storage unit sensed by the ice level sensing unit,
wherein the ice level sensing unit is arranged at a plurality of storage levels in a height direction of the ice storage unit, and
wherein the control unit compares an input ice level input with the ice level of the ice storage unit sensed by the ice level sensing unit, and controls the operation of the ice maker according to a comparison result.

2. The refrigerator of claim 1, wherein the ice level sensing unit comprises a plurality of light emission units for irradiating light, and a corresponding plurality of light reception units for sensing the light irradiated from the plurality of light emission units.

3. The refrigerator of claim 2, wherein the plurality of light emission units and the plurality of light reception units are provided on the facing surfaces of the ice storage unit to be level with each other.

4. The refrigerator of claim 2, wherein the light irradiated by the plurality of light emission units and sensed by the plurality of light reception units is infrared light.

5. The refrigerator of claim 1, further comprising a display unit for displaying the ice storage level of the ice storage unit sensed by the ice level sensing unit.

6. The refrigerator of claim 1, further comprising an ice level input unit for inputting a level of the ice to be stored in the ice storage unit from among a plurality of ice levels.

7. The refrigerator of claim 6, further comprising a display unit for displaying the ice level input through the ice level input unit.

8. A refrigerator, comprising:
an ice maker configured to be supplied with water, for making ice and transferring the ice to an ice storage unit;
the ice storage unit for storing the ice transferred from the ice maker;
an ice level sensing unit for sensing a level of the ice stored in the ice storage unit in a non-contact type;
an ice level input unit for inputting a level of the ice to be stored in the ice storage unit from among a plurality of ice levels; and
an ice level display unit for displaying both the ice level input through the ice level input unit and the ice storage level of the ice storage unit sensed by the ice level sensing unit,
wherein the ice level sensing unit is arranged at a plurality of storage levels in a height direction of the ice storage unit.

9. The refrigerator of claim 8, wherein the ice level sensing unit comprises a plurality of light emission units for irradiating light, and a corresponding plurality of light reception units for sensing the light irradiated from the plurality of light emission units.

10. The refrigerator of claim 8, further comprising a control unit for comparing the ice level input through the ice level input unit with the ice storage level of the ice storage unit sensed by the ice level sensing unit, and controlling the operation of the ice maker according to the comparison result.

11. A refrigerator, comprising:
an ice storage unit formed in the refrigerator;
a transfer means for transferring ice being provided at one side of the ice storage unit;
an ice guide unit communicating with the ice storage unit, and guiding the ice to be externally dispensed;
an ice sensing unit provided at the ice guide unit, for sensing an amount of the ice passing through the ice guide unit;
a control unit for controlling the operation of the transfer means; and
an ice amount input unit for inputting an amount of ice to be dispensed through the ice guide unit from among a plurality of ice amounts and transferring the input ice amount to the control unit,
wherein the control unit compares the ice amount input by the ice amount input unit with the ice amount sensed by the ice sensing unit and controls the operation of the transfer means according to a comparison result.

12. The refrigerator of claim 11, wherein the ice amount input unit comprises an ice amount input button for inputting an ice amount, and an ice amount display window for displaying the ice amount input through the ice amount input button, or an amount of the ice to be dispensed.

13. The refrigerator of claim 11, wherein a flat cross section of the ice guide unit is larger than a maximum cross section of an ice piece by a predetermined area so that the ice pieces can consecutively pass through the ice guide unit one by one.

14. The refrigerator of claim 11, further comprising a dispensing hole formed at the outer portion of the refrigerator to communicate with the ice guide unit, for dispensing ice,
wherein the ice guide unit further comprises an opening/closing means installed closely to the dispensing hole, for opening and closing the ice guide unit.

15. The refrigerator of claim 11, wherein the ice sensing unit comprises a light emission unit for generating light, and a light reception unit for receiving the light generated by the light emission unit.

16. The refrigerator of claim 11, wherein the transfer means comprises:
a transfer motor provided in the opposite direction to an outlet for discharging ice from the ice storage unit; and
a transfer screw installed in the ice storage unit, connected to the transfer motor, and rotated to transfer the ice to the outlet of the ice storage unit.

17. The refrigerator of claim 11, further comprising:
an ice maker configured to be supplied with water, for making ice and transferring the ice to the ice storage unit; and
an ice level sensing unit for sensing a level of the ice stored in the ice storage unit in a non-contact type.

18. The refrigerator of claim 17, wherein the ice level sensing unit comprises a light emission unit for irradiating light, and a light reception unit for sensing the light irradiated from the light emission unit.

19. The refrigerator of claim 17, further comprising:
an ice level input unit for inputting the level of the ice to be stored in the ice storage unit, and transferring the input ice level to a control unit, wherein the control unit compares the ice level input through the ice level input unit with the ice level of the ice storage unit sensed by the ice level sensing unit, and controls the operation of the ice maker according to the comparison result.

20. The refrigerator of claim 19, wherein the ice level input unit comprises an ice level input button for inputting the ice level to be stored in the ice storage unit, and an ice level display window for displaying at least one of the ice level input through the ice level input button and the ice level of the ice storage unit sensed by the ice level sensing unit.

21. A refrigerator, comprising:
- an ice maker configured to be supplied with water, for making ice and transferring the ice to an ice storage unit;
- the ice storage unit for storing the ice transferred from the ice maker;
- an ice guide unit communicating with the ice storage unit, and guiding the ice to be externally dispensed;
- an ice amount input unit for inputting an amount of ice to be dispensed through the ice guide unit from among a plurality of ice amounts; and
- a display unit for displaying the ice amount input through the ice amount input unit.

22. The refrigerator of claim 21, wherein the display unit further comprises an ice level input button for inputting a level of ice to be stored in the ice storage unit.

23. The refrigerator of claim 22, wherein the display unit further displays the ice level input through the ice level input button.

24. The refrigerator of claim 21, further comprising an ice level sensing unit for sensing a level of ice stored in the ice storage unit in a non-contact type, wherein the display unit further displays the ice level sensed by the ice level sensing unit.

25. The refrigerator of claim 21, wherein the ice amount input button is formed to input a number of ice pieces.

26. The refrigerator of claim 21, further comprising an ice sensing unit, provided at the guide unit, for sensing an amount of the ice passing through the ice guide unit,
- wherein the display unit further displays the amount of the ice dispensed through the ice guide unit.

27. The refrigerator of claim 26, wherein the display unit displays an ice amount obtained by subtracting the amount of the ice dispensed through the ice guide unit from the ice amount input through the ice amount input button.

* * * * *